Nov. 10, 1970   H. S. GLEASON, JR   3,539,252

AUTOMATIC EXPOSURE CONTROL

Filed Jan. 11, 1968   2 Sheets-Sheet 2

HORATIO S. GLEASON, JR.
INVENTOR.

BY Daniel E. Gragon
Robert W. Hampton

ATTORNEYS 3,539,252
AUTOMATIC EXPOSURE CONTROL
Horatio S. Gleason, Jr., Rochester, N.Y., assignor to Eastman Kodak Company, Rochester, N.Y., a corporation of New Jersey
Filed Jan. 11, 1968, Ser. No. 697,220
Int. Cl. G03b 7/10, 19/18
U.S. Cl. 352—141       2 Claims

ABSTRACT OF THE DISCLOSURE

Automatic exposure control is effected by coupling a variable-aperture diaphragm to a unidirectional driving member through a reversible clutch that is actuatable to operate alternatively in forward and reverse directions by two electromagnets energizable by light-responsive circuitry. The diaphragm comprises a pair of overlapping plates having shaped apertures which cooperate to vary the effective aperture size upon relative movement of the plates, each plate having a rack meshed with a pinion coupled to the clutch. The clutch comprises a wheel having in one face an annular channel which receives the unidirectional driving member between two radially spaced, axially extending surfaces defining the channel. The wheel is rotatably mounted on the mid-portion of a pendulum-like member whose end portion comprises an armature disposed between the two electromagnets. Energization of one electromagnet in response to light below a first predetermined intensity moves the armature and hence the wheel in one direction so that one of the axially extending surfaces is engaged by the driving member to effect rotation of the wheel and movement of the plates in one direction to thereby increase the effective aperture size. Energization of the other electromagnet in response to light above a second predetermined intensity moves the armature and wheel in the opposite direction so that the other of the axially extending surfaces is engaged by the driving member to effect rotation of the wheel and movement of the plates in the opposite direction to thereby decrease the effective aperture size.

CROSS-REFERENCE TO RELATED APPLICATION

Reference is made to commonly assigned, copending U.S. patent application Ser. No. 697,219, entitled, "Tri-Stable Circuit for Photoelectric Exposure Control," filed Jan. 11, 1968, in the name of Oran T. Casebeer.

BACKGROUND OF THE INVENTION

In the prior art it has been a problem to provide a suitable automatic exposure control. Usually some kind of electrical to mechanical transducer is used to actually move the exposure setting element. Either the exposure setting element must be very light so that it may be driven by a very small amount of power or the exposure setting element is rugged and heavy therefore necessitating a large transducer which requires a large amount of current and large electrical controls. It has therefrore been apparent that one either has a choice of a light fragile exposure control which is easily contaminated by dirt or a large bulky exposure control that is expensive.

SUMMARY OF THE INVENTION

It is therefore an object of the invention to provide an exposure control which is simple and inexpensive but yet is rugged enough to be trouble-free.

The above and other objects of the invention are accomplished by providing a drive member which rotates whenever the exposure control is being operated. This member may conveniently be an extension of the film feeding mechanism or the shutter mechanism in a movie camera. The exposure control is geared to a clutch which engages the rotating drive member whenever it is desired to change the exposure. Provision is made for clutching to the rotating member in either of two directions so that the exposure may be changed in two correspondingly different directions.

DESCRIPTION OF THE PREFERRED EMBODIMENT

Figure 1:
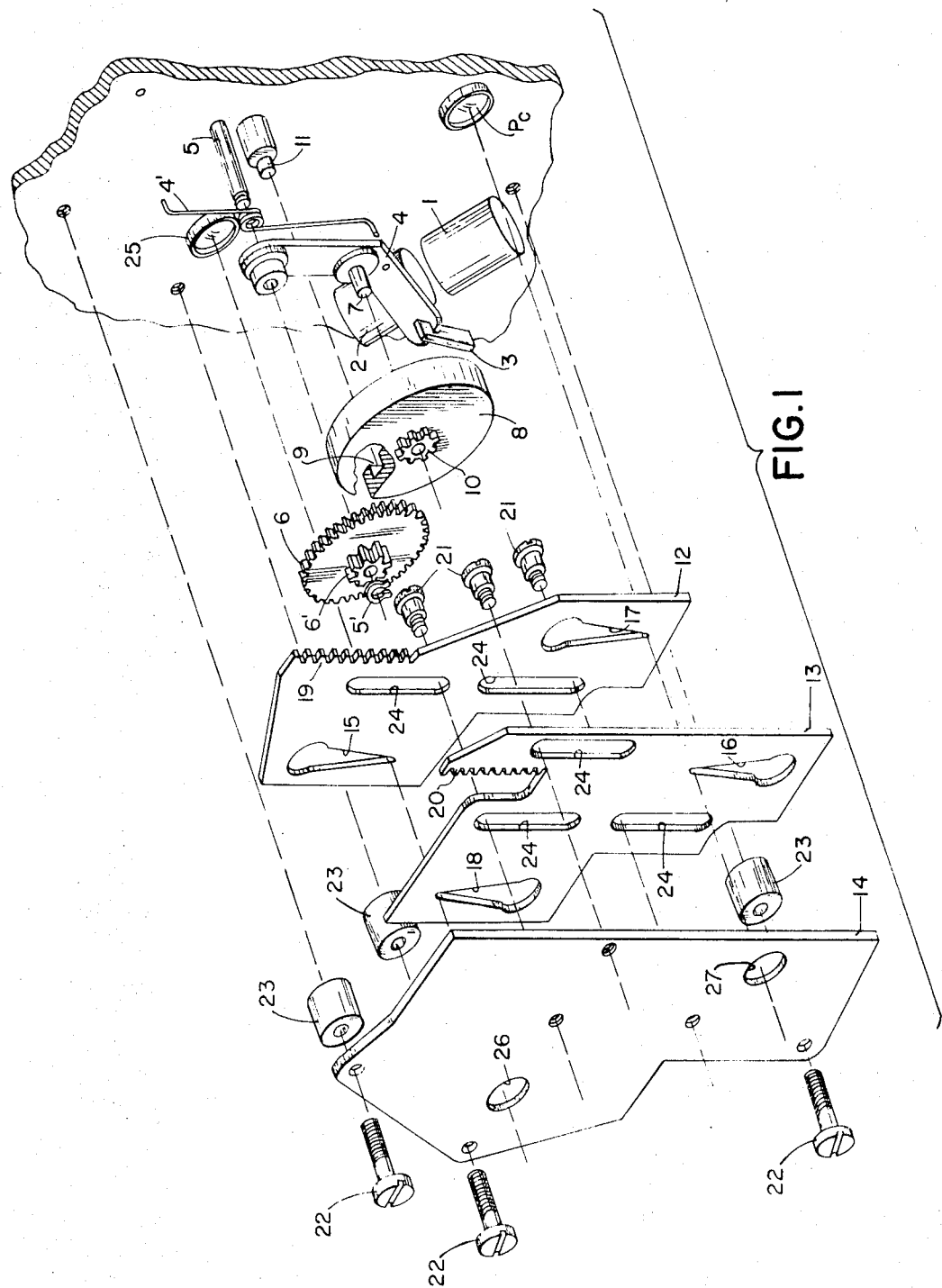
FIG. 1 shows an exploded view of the invention as embodied in a motion picture camera.

Referring to FIG. 1, there is shown two electromagnets 1 and 2 which cooperate with an armature 3. The armature 3 is mounted on an arm 4 which is pivotally mounted on stem 5. This type of arrangement provides a system whereby when electromagnet 1 is energized, armature 3 will be drawn to it thus swinging arm 4 to the right. When electromagnet 2 is energized, armature 3 will be attracted to it thus swinging arm 4 to the left. Spring 4' biases arm 4 slightly to the left to counteract the force of gravity so that when neither electromagnet is energized, armature 3 will be positioned approximately midway between the two electromagnets. Of course, arm 4 may be counterbalanced in a manner well known in the meter art instead of using spring 4'.

Pulley 8 is a solid cylinder having a circular groove 9 in one side and a gear 10 on the other side. The pulley mounts on pin 7 which is in turn mounted on arm 4. Whenever arm 4 is pivoted, pulley 8 is pivoted with it.

Drive roller 11 is coupled to a source of rotation which is constantly running whenever the exposure control is operated. Typically it may be coupled to the motor of a motion picture camera. However, the invention is not to be limited to motion picture cameras. Drive roller 11 is positioned so that it fits into groove 9 of pulley 8. The groove 9 in the pulley 8 is proportioned so that drive roller 11 can be in contact with either side of the groove without being in contact with the opposite side, or can be in contact with neither side. When the drive roller 11 is rotating, movement of arm 4 changes the contact of drive roller 11 with pulley 8 from the inside of groove 9 to the outside of groove 9. When drive roller 11 is in contact with the inside of groove 9, it drives pulley 8 in one direction, whereas when it is in contact with the outside of groove 9, it drives the pulley in the other direction. When drive roller 11 is contacting neither the inside nor the outside of groove 9, pulley 8 is not driven and is thus in a neutral position. Thus, energization of either electromagnet 1 or electromagnet 2 will determine the direction of rotation of pulley 8. If neither electromagnet 1 nor electromagnet 2 are energized, the arm 4 will assume its center position and pulley 8 will not be driven.

As was mentioned above, arm 4 is mounted on stem 5. Also mounted on stem 5 is gear 6 which as a set of teeth on its periphery and a set of teeth 6' at its center. Gear 6 is held onto pin 5 by a conventional C-ring 5'.

The exposure regulating assembly is made up of three plates, 12, 13 and 14. Plate 14 serves as a mount. Plates 12 and 13 are mounted to plate 14 by means of slots 24 so that plates 12 and 13 can move in the slots when the assembly is complete. Plates 12 and 13 have complementary apertures 18 and 15 which are used to regulate the amount of light entering the camera through lens 25, and another set of complementary apertures 16 and 17 which are used to regulate the amount of light which impinges upon photocell $P_c$. Plates 12 and 13 furthermore have toothed edges 19 and 20 which mesh with the smaller diameter teeth 6' of gear 6. Thus, movement of gear 6 causes relative movement of plates 12 and 13 with respect to each other, thus changing the effective aperture formed by apertures 18 and 15, and the effective aperture formed by apertures 16 and 17.

The three plates 12, 13 and 14 are held together by shoulder screws 21. The aperture-forming assembly is held to the remainder of the operating mechanism by screws 22 and spacers 23.

It is to be noted that plate 14 has been formed with two apertures 26 and 27 which admit light to lens 25 and cell $P_c$ respectively. These apertures could be larger, however, without affecting the operation of the device.

Figure 2:
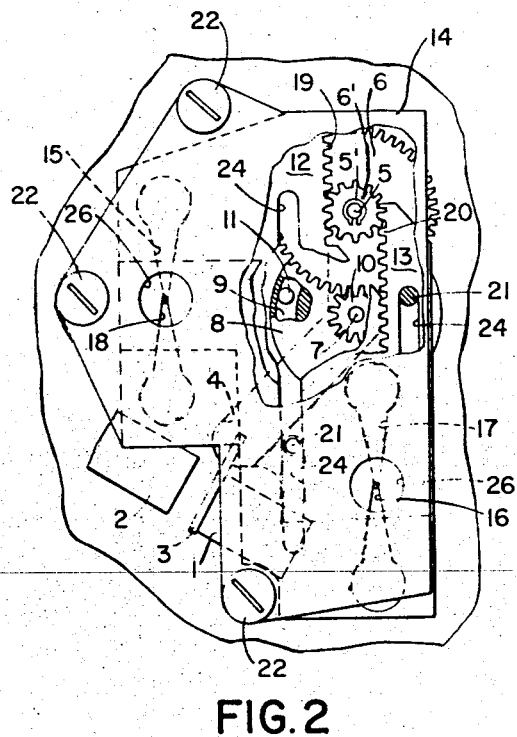
FIG. 2 is a plan view of the device of FIG. 1 showing the position of the components when the exposure regulator is being driven in one direction.
Figure 3:
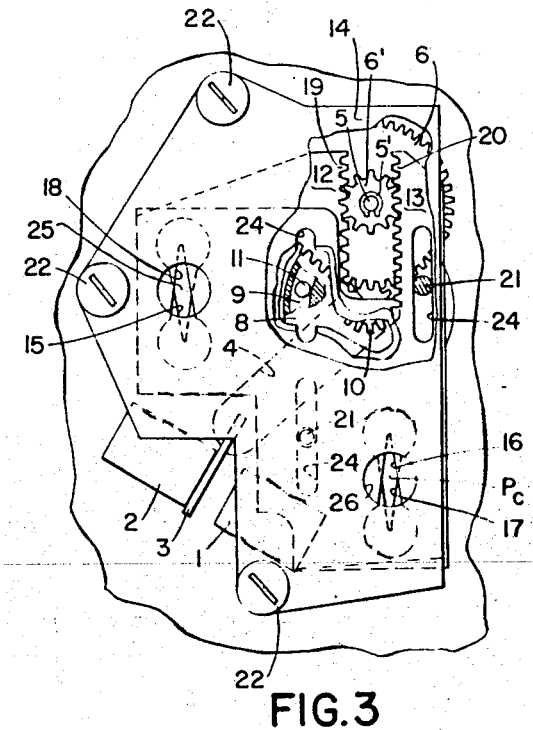
FIG. 3 is a plan view of the device of FIG. 1 showing the components when the exposure regulator is being driven in its opposite direction.

Referring to FIGS. 2 and 3, there is shown a plan view partly in section of the exposure-regulating mechanism and the operating mechanism. FIG. 2 shows electromagnet 1 to be energized while electromagnet 2 is unenergized. In this state armature 3 is drawn to electromagnet 1 thus bringing arm 4 and pulley 8 in the direction of magnet 1. This causes groove 9 is pulley 8 to come in contact with the drive roller 11 at the outer surface of groove 9. This causes pulley 8 to turn in the same direction as drive roller 11. In FIG. 2, members 12 and 13 are at their extreme upper and lower positions, respectively.

However, when electromagnet 2 becomes energized and electromagnet 1 becomes deenergized, armature 3 is drawn to electromagnet 2 as shown in FIG. 3. This moves arm 4 and pulley 8 in the direction of electromagnet 2. Drive roller 11 therefore contacts the inner surface of groove 9, thus driving the pulley in a direction opposite to the direction in which the drive roller itself is turning. FIG. 3 shows the exposure regulator to be in an intermediate position.

Figure 4:
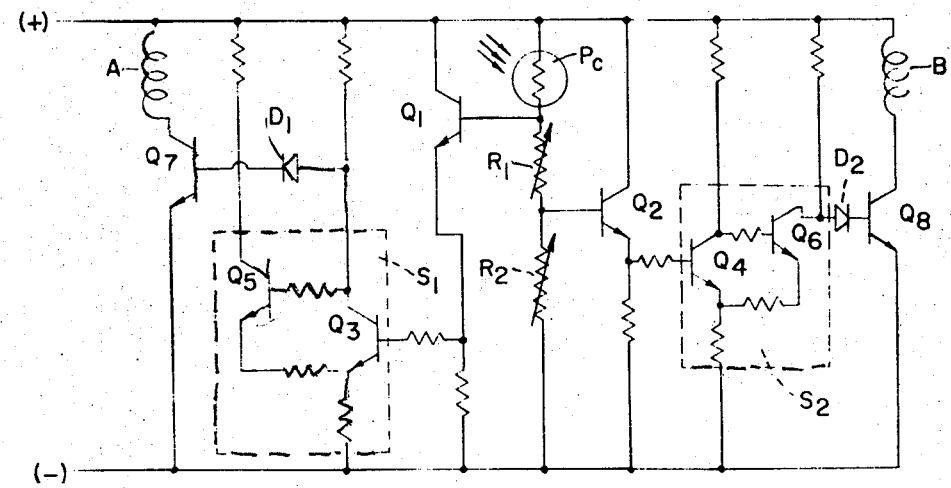
FIG. 4 shows a circuit diagram of an arrangement which may be used to drive the exposure control.

FIG. 4 shows a circuit diagram of a driving circuit for controlling the two electromagnets. It is to be understood that this circuit is merely a preferred embodiment. Other circuits which perform the same function could be used. In this figure, the magnets have been identified as A and B, the B coil being the electromagnet which causes the exposure regulator to admit less light and the A coil being the electromagnet which causes the exposure regulator to admit more light. The positioning of the two coils, i.e., whether a particular coil would be identified as 1 or 2 in FIGS. 1–3, would depend on the direction of rotation of drive roller 11.

The circuit consists basically of two Schmitt triggers $S_1$ and $S_2$ which are caused to switch at two different voltage levels. The Schmitt triggers $S_1$ and $S_2$ have been enclosed in dotted lines. Since a Schmitt trigger per se is well known in the art, its operation need not be explained here.

The circuit operates as follows: Photoconductor $P_c$ is connected in series with variable resistors $R_1$ and $R_2$. The junction between photocell $P_c$ and resistor $R_1$ is connected to the base of transistor $Q_1$ which acts as an emitter-follower. The junction between variable resistor $R_1$ and $R_2$ is connected to the base of transistor $Q_2$ which also acts as an emitter-follower.

The output of transistors $Q_1$ and $Q_2$ are fed to Schmitt triggers $S_1$ and $S_2$. The output from Schmitt trigger $S_1$ is taken from the collector of transistor $Q_3$ through diode $D_1$ to the base of transistor $Q_7$ which feeds coil A. The output of Schmitt trigger $S_2$ is taken from the collector of transistor $Q_6$ through diode $D_2$ to the base of transistor $Q_8$ which feeds coil B.

At low light levels photoconductor $P_c$ has a high resistance which provides approximately ground potential on the bases of transistors $Q_1$ and $Q_2$, thus turning them off. As the light level increases on photocell $P_c$, the voltages on the bases of transistors $Q_1$ and $Q_2$ rise. The voltage on the base of transistor $Q_1$ rises faster than the voltage on the base of transistor $Q_2$, because of the voltage drop across resistor $R_1$. As the voltage rises on the base of transistor $Q_1$, $Q_1$ starts to conduct thus raising the voltage on the base of transistor $Q_3$. As is well known in the art, when the voltage on the base of transistor $Q_3$ reaches a certain level, transistor $Q_3$ will conduct causing transistor $Q_5$ to turn off and causing transistor $Q_3$ to become saturated. When this occurs, the voltage on the base of transistor $Q_7$ drops to a low value thus turning off transistor $Q_7$ and deenergizing coil A.

At this point in the operation the voltage on the base of transistor $Q_1$ is high enough to make it conduct. The voltage on the base of transistor $Q_2$, however, is not high enough to make it conduct so that it is still nonconducting. Therefore, transistor $Q_4$ is off and transistor $Q_6$ is on. Therefore, transistor $Q_8$ is off. During this intermediate period when the voltage on the base of transistor $Q_1$ is high enough to turn it on, but the voltage on the base of transistor $Q_2$ is not high enough to turn it on, neither coil is energized. The circuit is therefore in its neutral state. The exposure regulator is not driven in either direction. As the light on photoconductor $P_c$ further increases, the voltage on the base of transistor $Q_2$ increases to the point where transistor $Q_2$ turns on. This turns on transistor $Q_4$ thus turning off transistor $Q_6$ and saturating transistor $Q_4$ so that transistor $Q_8$ is turned on thus energizing coil B.

As will be readily apparent, when the light level on photoconductor $P_c$ decreases, transistor $Q_2$ will be the first to react. This will turn off transistor $Q_4$ and turn on transistor $Q_6$ which in turn turns off transistor $Q_8$ thus changing the circuit back to its neutral state. As the light level further decreases; transistor $Q_1$ turns off thus turning off transistor $Q_3$ and turning on transistor $Q_5$ which turns on transistor $Q_7$ thus energizing coil A.

As mentioned above, coil A is the electromagnet which causes the exposure regulator to open whereas coil B is the electromagnet which causes the exposure regulator to close.

Diodes $D_1$ and $D_2$ are used to bias the bases of transistors $Q_7$ and $Q_8$, respectively, since the drop across the diode is relatively constant when it is conducting.

Resistor $R_1$ is used to vary the difference in voltage between the turn-on potential of transistor $Q_1$ and the turn-on potential of transistor $Q_2$. This control effectively varies the range during which the circuit is in its neutral mode.

Resistor $R_2$ regulates the level at which transistors $Q_1$ and $Q_2$ conduct, i.e., resistor $R_2$ is a calibrating resistor to match the response of the circuit to the light impinging upon photoconductor $P_c$.

It will be apparent to a person skilled in the art that the system operates as a "null" type of exposure control. When the incident light is higher than desired, the light which falls on both the photocell $P_c$ and on lens 25 is decreased until it reaches the desired value. The system then changes to its neutral mode where no change takes place. When the incident light is too low, the two apertures open until the photocell $P_c$ is exposed to the proper amount of light.

As would be apparent to a person skilled in the art, the circuitry has been shown using solid state devices such as transistors, solid-state diodes and a photoconductor. It is within the contemplation of the invention, however, to use other control devices such as vacuum tubes, vacuum diodes, and a vacuum photocell. It is further within the contemplation of the invention to use any type of trigger instead of the Schmitt trigger shown. For instance, a pair of bistable multivibrators could be used instead of the Schmitt triggers $S_1$ and $S_2$ shown in the drawing.

Although it is preferred that the control circuit for the exposure control use a triggering arrangement, it is within the contemplation of the invention to use a control circuit having merely analog amplifiers.

It is also within the contemplation of the invention that instead of using a sliding plate type of exposure regulator, such as is shown in FIG. 1 at 12, 13 and 14, to use any type of conventional exposure regulator such as those which change the shutter speed or the diaphragm aperture or both.

The invention has been described in detail with particular reference to the preferred embodiment thereof, but it will be understood that variations and modifications can be effected within the spirit and scope of the invention.

What is claimed is:

1. In a camera having an exposure aperture of variable size to regulate the amount of light passing through the aperture, an apparatus for automatically varying the exposure aperture size, said apparatus comprising:
    (a) varying means movable alternatively in first and second directions for varying the exposure aperture size, said varying means including
        (1) a pair of overlapping plates, one of said plates being movable relative to the other, each of said plates having a set of gear teeth and a shaped aperture, the aperture in said one plate cooperating with the aperture in said other plate to vary the amount of light passing through said apertures as said one plate is moved relative to said other plate,
        (2) a rotatable wheel, and
        (3) a gear having teeth in meshed relationship with the gear teeth on said plates, said gear being coupled to said wheel, whereby rotation of said wheel effects movement of said one plate relative to said other plate to vary the amount of light passing through said apertures;
    (b) driving means rotatable in one direction only and couplable to said varying means for driving said varying means alternatively in said first and second directions;
    (c) coupling means selectively actuatable for coupling said driving means to said varying means to drive said varying means alternatively in said first and second directions;
    (d) transducer means electrically energizable for selectively actuating said coupling means to couple said driving means to said varying means so as to drive said varying means alternatively in said first and second directions; and
    (e) energizing means sensitive to a variable condition and coupled electrically to said transducer means for energizing said transducer means to actuate said coupling means to couple said driving means to said varying means so as to drive said varying means in said first direction when said variable condition is above a first value and to actuate said coupling means to couple said driving means to said varying means so as to drive said varying means in said second direction when said variable condition is below a second value, said second value being below said first value.

2. In a camera having an exposure aperture of variable size to regulate the amount of light passing through the aperture, an apparatus for automatically varying the exposure aperture size, said apparatus comprising:
    (a) varying means movable alternatively in first and second directions for varying the exposure aperture size, said varying means including
        (1) a pair of overlapping plates, one of said plates being movable relative to the other, each of said plates having a set of gear teeth and a shaped aperture, the aperture in said one plate cooperating with the aperture in said other plate to vary the amount of light passing through said apertures as said one plate is moved relative to said other plate,
        (2) a rotatable wheel having a groove therein, and
        (3) a gear having teeth in meshed relationship with the gear teeth on said plates, said gear being coupled to said wheel, whereby rotation of said wheel effects movement of said one plate relative to said other plate to vary the amount of light passing through said apertures;
    (b) driving means rotatable in one direction only and couplable to said varying means for driving said varying means alternatively in said first and second directions, said driving means including a drive roller disposed in said groove for engagement with said wheel;
    (c) coupling means selectively actuatable for coupling said driving means to said varying means to drive said varying means alternatively in said first and second directions, said coupling means including an arm pivotally mounted on the camera for movement relative to said roller, said wheel being rotatably mounted on said arm;
    (d) transducer means electrically energizable for selectively actuating said coupling means to couple said driving means to said varying means so as to drive said varying means alternatively in said first and second direction, said transducer means including an armature on said arm and a pair of energizable electromagnets, said armature being disposed between said electromagnets, whereby said wheel is rotated in said first direction when one of said electromagnets is energized and said wheel is rotated in said second direction when the other of said electromagnets is energized; and
    (e) energizing means sensitive to a variable condition and coupled electrically to said transducer means for energizing said transducer means to actuate said coupling means to couple said driving means to said varying means so as to drive said varying means in said first direction when said variable condition is above a first value and to actuate said coupling means to couple said driving means to said varying means so as to drive said varying means in said second direction when said variable condition is below value, said second value being below said first value.

References Cited
UNITED STATES PATENTS

| | | | |
|---|---|---|---|
| 2,885,471 | 5/1959 | King | 352—141 XR |
| 3,071,039 | 1/1963 | MacMillin | 352—141 |
| 3,122,978 | 3/1964 | Blieske. | |
| 3,388,648 | 6/1968 | Thiele et al. | 352—141 XR |
| 3,430,053 | 2/1969 | Westhaver. | |

JOHN M. HORAN, Primary Examiner

J. F. PETERS, Jr., Assistant Examiner

U.S. Cl. X.R.

95—10, 64; 250—237; 307—18, 28